US009804664B2

(12) United States Patent
Homchaudhuri et al.

(10) Patent No.: US 9,804,664 B2
(45) Date of Patent: Oct. 31, 2017

(54) ADAPTIVE CONTROL OF RF LOW POWER MODES IN A MULTI-RATE WIRELESS SYSTEM USING MCS VALUE

(71) Applicant: QUALCOMM Incorporated, San Jose, CA (US)

(72) Inventors: Sandip Homchaudhuri, San Jose, CA (US); Paul Husted, San Jose, CA (US); MeeLan Lee, Los Altos, CA (US); Srenik Mehta, Union City, CA (US); Kai Shi, San Jose, CA (US); Shahram Abdollahi-Alibeik, Los Gatos, CA (US); Zhanfeng Jia, Belmont, CA (US); Soraya Kasnavi, San Jose, CA (US); Ning Zhang, Saratoga, CA (US); David Kuochieh Su, Saratoga, CA (US); Subramania Sharma Thandaveswaran, Sunnyvale, CA (US); Kenneth Gainey, San Diego, CA (US); Ian David O'Donnell, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 14/287,663

(22) Filed: May 27, 2014

(65) Prior Publication Data

US 2015/0346807 A1    Dec. 3, 2015

(51) Int. Cl.
*G06F 1/32* (2006.01)
*H04W 52/02* (2009.01)

(52) U.S. Cl.
CPC .......... *G06F 1/3293* (2013.01); *G06F 1/3278* (2013.01); *G06F 1/3287* (2013.01); *H04W 52/0229* (2013.01); *Y02B 60/50* (2013.01)

(58) Field of Classification Search
CPC .... G06F 1/3293; G06F 1/3287; G06F 1/3278; H04W 52/0229; Y02B 60/50
See application file for complete search history.

(56) References Cited

U.S. PATENT DOCUMENTS 6,879,567 B2    4/2005  Callaway et al.
7,941,682 B2    5/2011  Adams
(Continued)

FOREIGN PATENT DOCUMENTS

WO    WO-2010123573 A1    10/2010
WO    WO-2013022469 A1    2/2013
(Continued)

OTHER PUBLICATIONS

Gast, Matthew. 802.11 Wireless Networks: The Definitive Guide. N.p.: O'Reilly Media, 2005. Web. Ch. 15, TGnSync.*
(Continued)

*Primary Examiner* — Phil Nguyen
*Assistant Examiner* — Brian J Corcoran
(74) *Attorney, Agent, or Firm* — Holland & Hart LLP

(57) ABSTRACT

Methods, systems, and devices are described for power conservation in a wireless communications system. In embodiments, power conservation may be achieved by adaptively controlling power modes of a wireless communication device, using a modulation and coding scheme (MCS) value as a factor for guidance. According to one aspect, the device may be in a reception mode. While in a first power mode, the device may receive control information for incoming data that is being transmitted via a transmission frame. The control information may be located in a first portion of the frame with the data following in a second portion of the frame. The control information may include or otherwise indicate an MCS value corresponding to the MCS applied to the incoming data. Based on the MCS (Continued)

value, the device may be adaptively switched to a second power mode for receiving the incoming data.

27 Claims, 12 Drawing Sheets

(56) References Cited

U.S. PATENT DOCUMENTS

| | | | |
|---|---|---|---|
| 8,265,048 B1 | 9/2012 | Donovan | |
| 8,971,213 B1 | 3/2015 | Hart | |
| 2004/0002306 A1 | 1/2004 | Haapoja et al. | |
| 2004/0266493 A1 | 12/2004 | Bahl et al. | |
| 2005/0138451 A1 | 6/2005 | Simpson et al. | |
| 2007/0133448 A1 | 6/2007 | Gao et al. | |
| 2007/0206695 A1* | 9/2007 | Ye | H04L 1/0003 375/267 |
| 2008/0080597 A1 | 4/2008 | Rofougaran | |
| 2008/0165715 A1* | 7/2008 | Liu | H04W 52/0229 370/311 |
| 2008/0220807 A1* | 9/2008 | Patel | H04B 1/0003 455/524 |
| 2008/0298290 A1 | 12/2008 | Wentink | |
| 2009/0010191 A1 | 1/2009 | Wentink | |
| 2009/0073940 A1 | 3/2009 | Shrivastava et al. | |
| 2009/0170509 A1* | 7/2009 | Cai | H04L 1/0003 455/434 |
| 2009/0245125 A1* | 10/2009 | Horisaki | H04L 43/067 370/252 |
| 2010/0014500 A1* | 1/2010 | Lee | H04L 1/0017 370/342 |
| 2010/0067421 A1 | 3/2010 | Gorokhov et al. | |
| 2010/0067422 A1 | 3/2010 | Kadous et al. | |
| 2010/0080134 A1 | 4/2010 | Maniatopoulos et al. | |
| 2010/0103810 A1* | 4/2010 | Kloos | H04B 7/0417 370/204 |
| 2010/0215011 A1* | 8/2010 | Pan | H04L 5/0064 370/329 |
| 2010/0265929 A1* | 10/2010 | Liao | H04L 1/0003 370/338 |
| 2010/0296567 A1* | 11/2010 | Qiu | H04B 1/109 375/227 |
| 2010/0322126 A1 | 12/2010 | Krishnaswamy et al. | |
| 2011/0065413 A1 | 3/2011 | Singer | |
| 2012/0155347 A1 | 6/2012 | Husted et al. | |
| 2012/0250731 A1 | 10/2012 | Taghavi Nasrabadi et al. | |
| 2012/0324315 A1 | 12/2012 | Zhang et al. | |
| 2013/0201838 A1 | 8/2013 | Homchaudhuri et al. | |
| 2013/0235796 A1 | 9/2013 | Kwon et al. | |
| 2013/0279353 A1 | 10/2013 | Ji et al. | |
| 2013/0343250 A1 | 12/2013 | Homchaudhuri et al. | |
| 2013/0343252 A1* | 12/2013 | Chakraborty | H04W 52/0261 370/311 |
| 2014/0078949 A1 | 3/2014 | Chu et al. | |
| 2014/0086124 A1 | 3/2014 | Knowles | |
| 2014/0086128 A1* | 3/2014 | Gomez | H04B 1/401 370/311 |
| 2014/0098729 A1 | 4/2014 | Chhabra et al. | |
| 2014/0204822 A1 | 7/2014 | Park et al. | |
| 2015/0036575 A1 | 2/2015 | Li et al. | |
| 2015/0085767 A1* | 3/2015 | Einhaus | H04L 1/0001 370/329 |
| 2015/0103767 A1 | 4/2015 | Kim et al. | |
| 2015/0139002 A1* | 5/2015 | Lee | H04W 24/08 370/252 |
| 2015/0351032 A1 | 12/2015 | Homchaudhuri et al. | |

FOREIGN PATENT DOCUMENTS

| | | |
|---|---|---|
| WO | WO-2013135475 A1 | 9/2013 |
| WO | WO-2014003463 A1 | 1/2014 |

OTHER PUBLICATIONS

Ahmadi, Sassan. LTE-advanced a Practical Systems Approach to Understanding 3GPP LTE Releases 10 and 11 Radio Access Technologies. Amsterdam: Elsevier, 2014. Safari Books Online, Oct. 10, 2013. Web. Sep. 8, 2016.*
Sesia, Stefania, Issam Toufik, and Matthew Baker. LTE—the UMTS Long Term Evolution: From Theory to Practice. Chichester, West Sussex, U.K.: Wiley, 2011. Safari Books Online, Sep. 6, 2011. Web. Sep. 8, 2016.*
Gast, Matthew S. "802.11ac: A Survival Guide." O'Reilly Media, Inc. O'Reilly Media, Jul. 23, 2013. Web. Jun. 13, 2017. (Excerpts from Chapter 3).*
ISA/EPO, International Search Report and Written Opinion of the International Searching Authority, Int'l Appl. No. PCT/US2015/031692, dated Aug. 14, 2015, European Patent Office, Rijswijk, NL, 9 pgs.
Gast, "Chapter 8, Section 6: Power Conservation," 802.11 Wireless Networks: The Definitive Guide, Second Edition, Apr. 2005, 8 pgs., URL: http://techbus.safaribooksonline.com/print?xmlid=0596100523%2Fwireless802dot112-CHP-8-SECT-6, O'Reilly Media, Inc., Sebastopol, CA.
IPEA/EPO, Second Written Opinion of the International Preliminary Examining Authority, Int'l App. No. PCT/US2015/031692, dated May 19, 2016, European Patent Office, Rijswijk, NL, 5 pgs.
Catreux et al., "Adaptive Modulation and MIMO Coding for Broadband Wireless Data Networks," IEEE Communications Magazine, Jun. 2002, pp. 108-115, vol. 40, No. 6, Institute of Electrical and Electronics Engineers.
Gast M., "802.11 Wireless Networks: The Definitive Guide, 2nd Edition—MAC Access Modes and Timing," Safari O'Reilly Media Inc., Apr. 25, 2005, 4 pgs., Ch. 3, Sec. 2, Retrieved from Web on Nov. 17, 2016. https://www.safaribooksonline.com/library/view/80211-wirelessnetworks/0596100523/.
Gast, M., "802.11 Wireless Networks: The Definitive Guide, 2nd Edition—Contention-Based Access Using the DCF," Safari O'Reilly Media Inc., Apr. 25, 2005, 3 pgs., Ch. 3, Sec. 3, Retrieved from Web on Nov. 17, 2016. https://www.safaribooksonline.com/library/view/80211-wirelessnetworks/0596100523/>.

\* cited by examiner

ADAPTIVE CONTROL OF RF LOW POWER MODES IN A MULTI-RATE WIRELESS SYSTEM USING MCS VALUE

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of network devices such as access points (APs) that can support communication for a number of wireless devices. A wireless device may communicate with a network device bidirectionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP. Additionally, a wireless communications network may include a number of network devices such as base stations (BSs) that can support communication for a number of wireless devices.

There may be cases in which a wireless communication device (e.g., station) may benefit from controlling power modes, allowing the device to power down or off components, such as radio components, and thereby reduce power consumption. In general, power saving is an important aspect of mobile communication devices because such devices are limited to an amount of power provided by a battery or batteries included in the device. Therefore, power conservation techniques that are simple to implement and may provide increased opportunities to reduce power consumption are desirable.

SUMMARY

The described features generally relate to various improved systems, methods, and/or apparatuses for power conservation in a wireless communications system. Power conservation may be achieved by adaptively controlling power modes of a wireless communication device, using a modulation and coding scheme (MCS) value as a factor for guidance. According to one aspect, the device may be in a reception mode. While in a first power mode, the device may receive control information for incoming data that is being transmitted via a transmission frame. The control information may be located in a first portion of the frame with the data following in a second portion of the frame. The control information may include or otherwise indicate an MCS value corresponding to the MCS applied to the incoming data. Based on the MCS value, the device may be adaptively switched to a second power mode for receiving the incoming data. Thus, power consumption by the device may be reduced by adaptively switching power modes according to the MCS value, for example, to receive incoming data in a lower power mode when appropriate and/or to receive incoming data in a higher power mode only as needed. The MCS value of an outgoing frame may similarly be used to adaptively switch power modes of the device when the device is in a transmission mode.

A method of adaptive power control for a wireless communication device is described. In one configuration, the method may involve receiving control information for incoming data in a transmission frame while in a first power mode of the device. The control information may include a modulation and coding scheme (MCS) value. The method may involve adaptively switching to a second power mode of the device based at least in part on the MCS value.

In some aspects, the method may involve receiving incoming data of the transmission frame while in the second power mode.

In some aspects, the second power mode may be a lower power mode than the first power mode. In such embodiments, adaptively switching to the second power mode may involve switching from a main synthesizer routed to each of a plurality of transmission/reception (Tx/Rx) chains associated with a modem for the first power mode to a plurality of local synthesizers routed respectively to one of the plurality of Tx/Rx chains for the second power mode. Alternatively or additionally, adaptively switching to the second power mode may involve: changing a voltage source of a phase locked loop (PLL), a synthesizer, or both; turning off a low dropout regulator (LDO) of a PLL, an LDO of a synthesizer, or both; changing a bias current to a high performance circuit; or, a combination thereof.

In other aspects, the second power mode may be a higher power mode than the first power mode. In such embodiments, adaptively switching to the second power mode may involve switching to a main synthesizer routed to each of a plurality of transmission/reception (Tx/Rx) chains associated with a modem for the second power mode from a plurality of local synthesizers routed respectively to one of the plurality of Tx/Rx chains for the first power mode. Alternatively or additionally, adaptively switching to the second power mode may involve: changing a voltage source of a phase locked loop (PLL), a synthesizer, or both; turning on a low dropout regulator (LDO) of a PLL, an LDO of a synthesizer, or both; changing a bias current to a high performance circuit; or, a combination thereof.

In some aspects, the method may involve adjusting for phase error before switching to the second power mode to mitigate phase error caused by switching. In such aspects, adjusting for phase error may involve increasing a bandwidth of a synthesizer loop to increase a settling rate of an associated voltage-controlled oscillator (VCO). Alternatively or additionally, adjusting for phase error may involve implementing an MCS rate for a transition point between the first power mode and the second power mode, the implemented MCS rate being lower than an MCS rate associated with the second power mode and having error vector magnitude (EVM) constraints that mitigate phase error caused by switching. Alternatively or additionally, adjusting for phase error may involve applying a predetermined phase adjustment.

In some aspects, adaptively switching to the second power mode also may be based on a length of a packet that is to be received by the device. Alternatively or additionally, adaptively switching to the second power mode also may be based on a beam-formed or single user packet that is to be received by the device. Alternatively or additionally, adaptively switching to the second power mode also may be based on a received signal strength indicator (RSSI), a signal-to-noise ratio (SNR) or a signal-to-interference-plus-noise ratio (SINR) of a packet that is to be received by the device.

In some aspects, receiving control information may involve receiving a wireless local area network (WLAN) preamble. In such aspects, switching to the second power mode may involve switching to the second power mode during receipt of the control information. Alternatively, switching to the second power mode may involve switching to the second power mode after receipt of the control information is completed.

In some aspects, the device may be a Long Term Evolution (LTE) device. In such aspects, receiving control information may involve receiving control information via a physical downlink control channel (PDCCH). In such aspects, switching to the second power mode may involve switching to the second power mode during receipt of the control information via the PDCCH. Alternatively, switching to the second power mode may involve switching to the second power mode after receipt the control information via the PDCCH is completed. In some aspects, the MCS value for the incoming data may be indicated in a downlink control information (DCI) grant.

A wireless communication device is described. In one configuration, the device may include a receiver configured to receive control information for incoming data in a transmission frame while in a first power mode of the device. The control information may include a modulation and coding scheme (MCS) value. The device also may include a power controller configured to adaptively switch to a second power mode of the device based at least in part on the MCS value. Further, the receiver and/or the power controller may be configured to perform various additional functions of the methods described above and as described further herein.

An apparatus for adaptive power control for a wireless communication device is described. In one configuration, the apparatus may include means for a receiving control information for incoming data in a transmission frame while in a first power mode of the device. The control information may include a modulation and coding scheme (MCS) value. The apparatus also may include means for adaptively switching to a second power mode of the device based at least in part on the MCS value. Further, the apparatus may include means configured to perform various additional functions of the methods described above and as described further herein.

A computer program product is described. In one configuration, the computer program product may be a non-transitory computer-readable medium including instructions stored thereon. The instructions may be executable by a computer to: receive control information for incoming data in a transmission frame while in a first power mode of the device, the control information including a modulation and coding scheme (MCS) value; and, adaptively switch to a second power mode of the device based at least in part on the MCS value. Further, the stored instructions may be executable by the computer to perform various additional functions of the methods described above and as described further herein.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
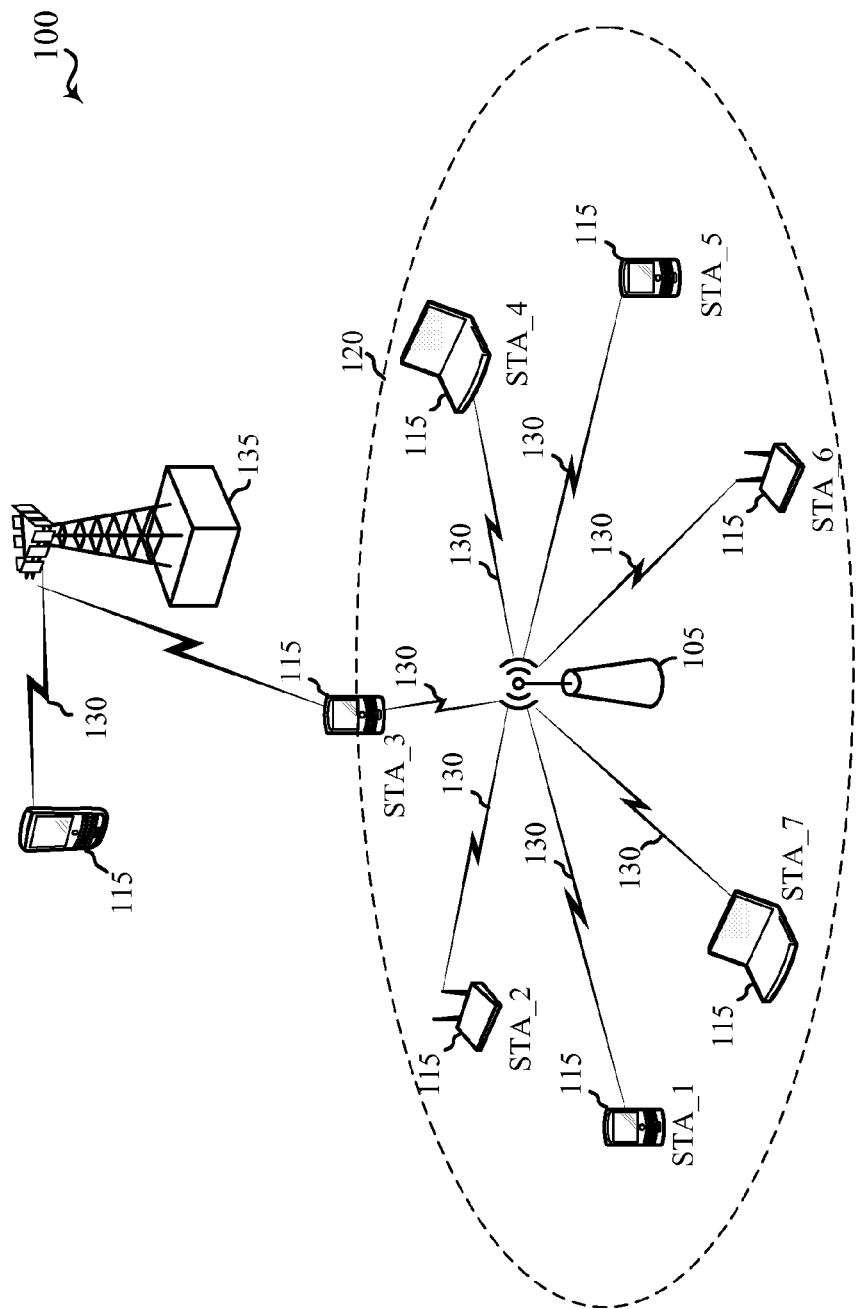
FIG. 1 shows a diagram that illustrates an example of a wireless communications system according to various embodiments.

Adaptive power control for a wireless communication device, such as a WLAN station or a Long Term Evolution (LTE) user equipment (UE), is described. In various embodiments, the device may be in a reception mode for receiving incoming data (e.g., frames or packets). The device initially may be configured to receive all packets in a first power mode. While in the first power mode, the device may receive control information for incoming data. The received control information may include a modulation and coding scheme (MCS) value associated with the incoming data. Based on the MCS value, the device may be adaptively switched to a second power mode. The device then may receive the incoming data while in the second power mode. Thus, contrary to conventional reception mode operation in which all incoming data is received by a device in a high power mode, the device may adaptively adjust the power mode based on the MCS value associated with the incoming data. Thus, the device may adaptively control power modes so that a lower power mode may be used whenever appropriate (e.g., the MCS allows a lower power mode to be used without sacrificing performance). As used herein, "high power mode" or "higher power mode" and "low power mode" or "lower power mode" are relative to each other, with no set values or specific power ratio, and may be determined in accordance with various implementations. Further, a high/higher power mode and a low/lower power may involve a respective range of power values and/or multiple distinct power values rather than a single set power value.

For example, the device may determine that the MCS value in the received control information is sufficiently low (e.g., MCS6 or lower) to allow the incoming data to be received with the device in a lower power mode. As such, the device may determine the appropriate power mode for incoming data (e.g., selecting between a high power mode and a lower power mode) and adaptively switch between power modes to reduce power consumption for receptions. In some embodiments, the second power mode may be a lower power mode that the first power mode. Alternatively, the second power mode may be a higher power mode than the first power mode.

In other various embodiments, the device may be in a transmission mode for transmitting outgoing data. Because the device may control or otherwise determine an MCS value associated with the outgoing data, the device may determine the appropriate power mode for outgoing data and adaptively switch between power modes to reduce power consumption for transmissions.

These and other features of various embodiments are described in further detail below. The power conservation techniques presented herein are generally described in connection with WLANs for simplicity. A WLAN (or Wi-Fi network) may refer to a network that is based on the protocols described in the various IEEE 802.11 standards (e.g., 802.11a/g, 802.11n, 802.11 ac, 802.11 ah, etc.). The same or similar techniques, however, may be used for various other wireless communications systems such as cellular wireless systems, peer-to-peer wireless communications, ad hoc networks, satellite communications systems, and other systems. The terms "system" and "network" may be used interchangeably.

Thus, the following description provides examples, and is not limiting of the scope, applicability, or configuration set forth in the claims. Changes may be made in the function and arrangement of elements discussed without departing from scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a WLAN 100 or Wi-Fi network is shown that may be configured to provide enhanced power conservation. The WLAN 100 includes an AP 105 and multiple associated stations 115. In this example, there are shown seven (7) stations or STAs 115, which are identified as STA_1, STA_2, STA_3, STA_4, STA_5, STA_6, and STA_7. The WLAN 100, however, may have more or fewer stations 115 than those shown in FIG. 1 since the number shown is simply for illustrative purposes. The AP 105 and the associated stations 115 may represent a basic service set (BSS). The various stations 115 in the BSS are able to communicate with one another through the AP 105. Also shown is a coverage area 120 of the AP 105, which may represent a basic service area (BSA) of the WLAN 100. Although not shown in FIG. 1, the BSS associated with the WLAN 100 is typically connected to a wired or wireless distribution system (DS) that allows multiple APs to be connected in an extended service set.

The AP 105 is configured to communicate bi-directionally with each of the stations 115 using transmissions 130. The transmissions 130 may include downlink transmissions (e.g., beacon frames) that are sent from the AP 105 to a station 115 as well as uplink transmissions (e.g., acknowledgments or ACK frames) that are sent from a station 115 to the AP 105. Typically, the AP 105 is configured to broadcast its downlink transmissions to the stations 115 that are within the coverage area 120.

In situations where a station 115 does not expect to actively transmit or receive data, it may be beneficial for the station 115 to power down certain components, such as radio components, in order to reduce power consumption of the station. Various wireless standards, such as the 802.11 standards, define a power-save mode for stations 115. In power-save mode, a station 115 may choose to enter a network sleep mode for at least one beacon interval, waking periodically to receive beacon frames from the AP 105 that include a delivery traffic indication message (DTIM). This mode may be referred to as a beacon monitoring mode or a DTIM mode. In some implementations, a DTIM may be transmitted periodically in beacon frames, such as, for example, every other beacon frame, and a station 115 in network sleep mode may awaken to receive every other beacon frame but otherwise remain asleep and may thereby reduce power consumption. To initiate a power-save mode, a station 115 may transmit a notification to the AP 105, so that the AP 105 will know how to handle data traffic destined for the station 115. In some examples, the AP 105 and one of the stations 115 may be configured to implement communications related to entry of a power save mode by a station 115.

Additionally, as shown in FIG. 1, a station or stations 115 (e.g., STA_3) may be configured to communicate with a base station 135 (e.g., eNodeB, etc.) via a different radio access technology, such as Long Term Evolution (LTE), for example, either concurrently with or at different times than WLAN communications with the AP 105. As illustrated, the stations 115 may be various wireless communication devices or user equipment (UEs) such as cell phones, smartphones, computers, laptops, modems, etc.

The station(s) 115 may be configured to adaptively control power modes thereof. As described above, a station 115 (wireless communication device) may implement adaptive control of its power modes based on an MCS value in control information received for incoming data and/or on an MCS value determined for outgoing data.

Figure 2A:
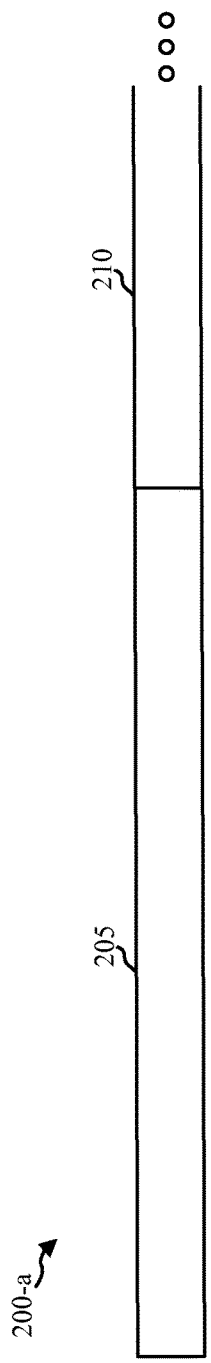
FIGS. 2A and 2B show diagrams that illustrate examples of frames.

With reference now to FIG. 2A, a diagram is shown that illustrates an example of a frame 200-a that may be used in a wireless communication system, including the wireless communication system described above with reference to FIG. 1. The frame 200-a may include a packet(s) and may be used in WLAN or similar wireless communication systems. A first portion 205 of the frame 200-a may represent a preamble or header of the frame 200-a. A second portion 210 may represent data contents of the frame 200-a. The first portion 205 (e.g., WLAN preamble) may include control information, including an MCS value as discussed herein.

Figure 2B:
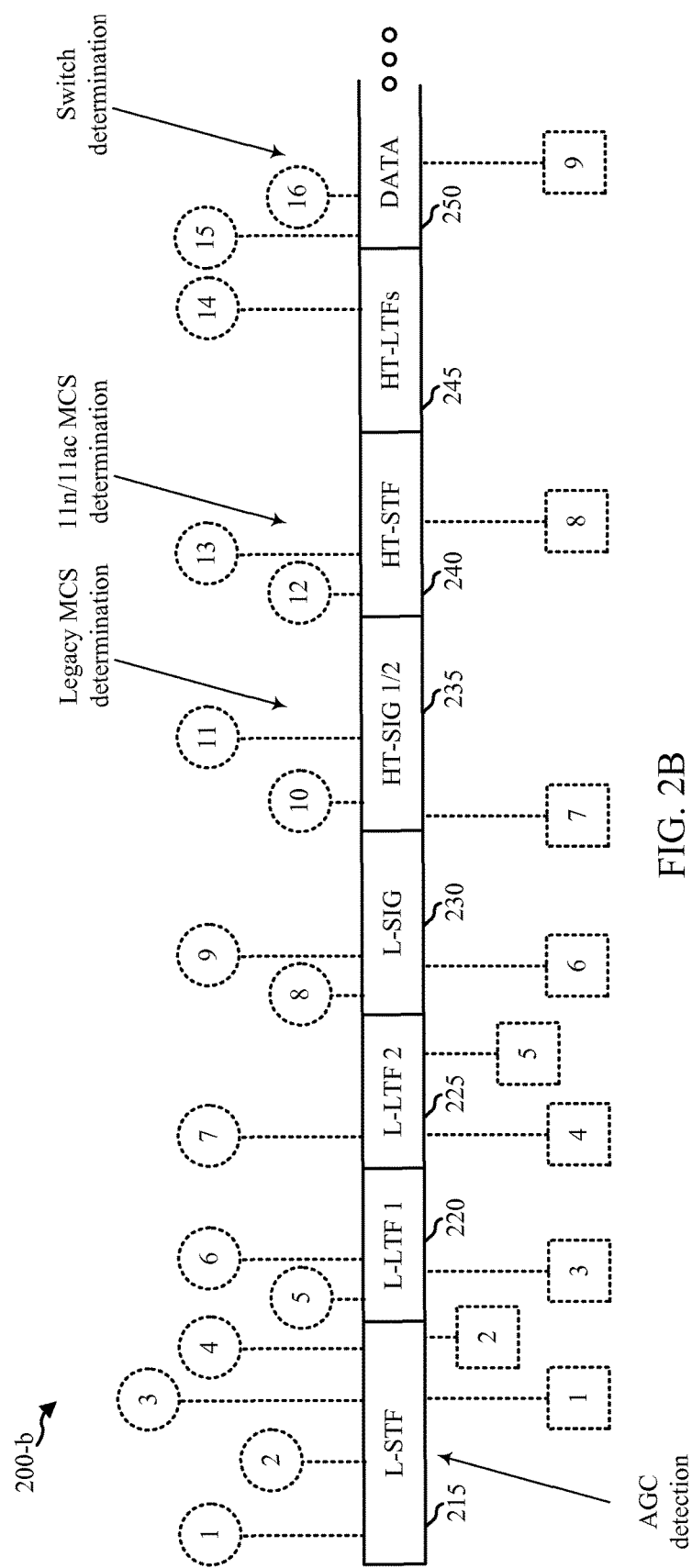

FIG. 2B shows a diagram that illustrates another example of a frame 200-b that may be used in a wireless communication system, including the wireless communication system described above with reference to FIG. 1. The frame 200-b may include multiple packets and may be an example of the frame 200-a of FIG. 2A. The frame 200-b may include a legacy short training field (L-STF) 215, a first legacy long training field (L-LTF 1) 220, a second legacy long training field (L-LTF 2) 225, a legacy signal (L-SIG) field 230, a high throughput signal (HT-SIG 1/2) field 235, a high throughput short training field (HT-STF) 240, a high throughput long training field (HT-LTF) 245, and a data field 250. The diagram also illustrates where various determinations may be made, such as automatic gain control (AGC) detection, MCS determination(s) (e.g., legacy and/or 11n/11ac), and power mode switch determination. Although the power mode switch determination is generally indicated at the data field 250, it should be understood that the determination may be made before the data field 250 occurs, for example, so that the switch is implemented for receipt of data in the data field 250.

The dashed circles shown above the frame 200-*b* identify events that may be associated with various aspects of the fields of the frame 200-*b*. For example, events 1, 2, 3, and 4 are associated with the L-STF field 215, while events 15 and 16 are associated with the data field 250. The various events above the frame 200-*b* are as follows: 1—drop gain; 2—find strong in-band signal; 3—voting for OFDM; 4—coarse DC/ppm; 5—ste (coarse timing); 6—fine DC; 7—fine timing; 8—fine ppm; 9—channel estimation; 10—rate length; 11—find ht packet (pkt); 12—ht fine ppm; 13—modulation and coding scheme (mcs) length 20/40 aggressive (aggr.) short guard interval (sgi.) etc.; 14—ht fine timing; 15—ht channel estimation (cha. est.); and 16—start data detection (det) and tracking. The events shown are for reference only and may or may not occur depending on a given implementation.

The dashed squares shown below the frame 200-*b* identify events that may trigger physical (PHY) layer errors associated with the frame 200-*b*. Each of these events corresponds to a particular field of the frame 200-*b*. For example, events 1 and 2 are associated with the L-STF field 215, while event 9 is associated with the data field 250. The various events below the frame 200-*b* are as follows: 1—voting for cck; 2—scorr low; 3—xcorr low; 4—fine timing error; 5—ste time out; 6—long scorr low; 7—illegal rate/length or parity error; 8—ht-sig cyclic redundancy check (crc) error; and 9—power drop/high. Again, the events shown are for reference only and may or may not occur depending on a given implementation.

Figure 3:
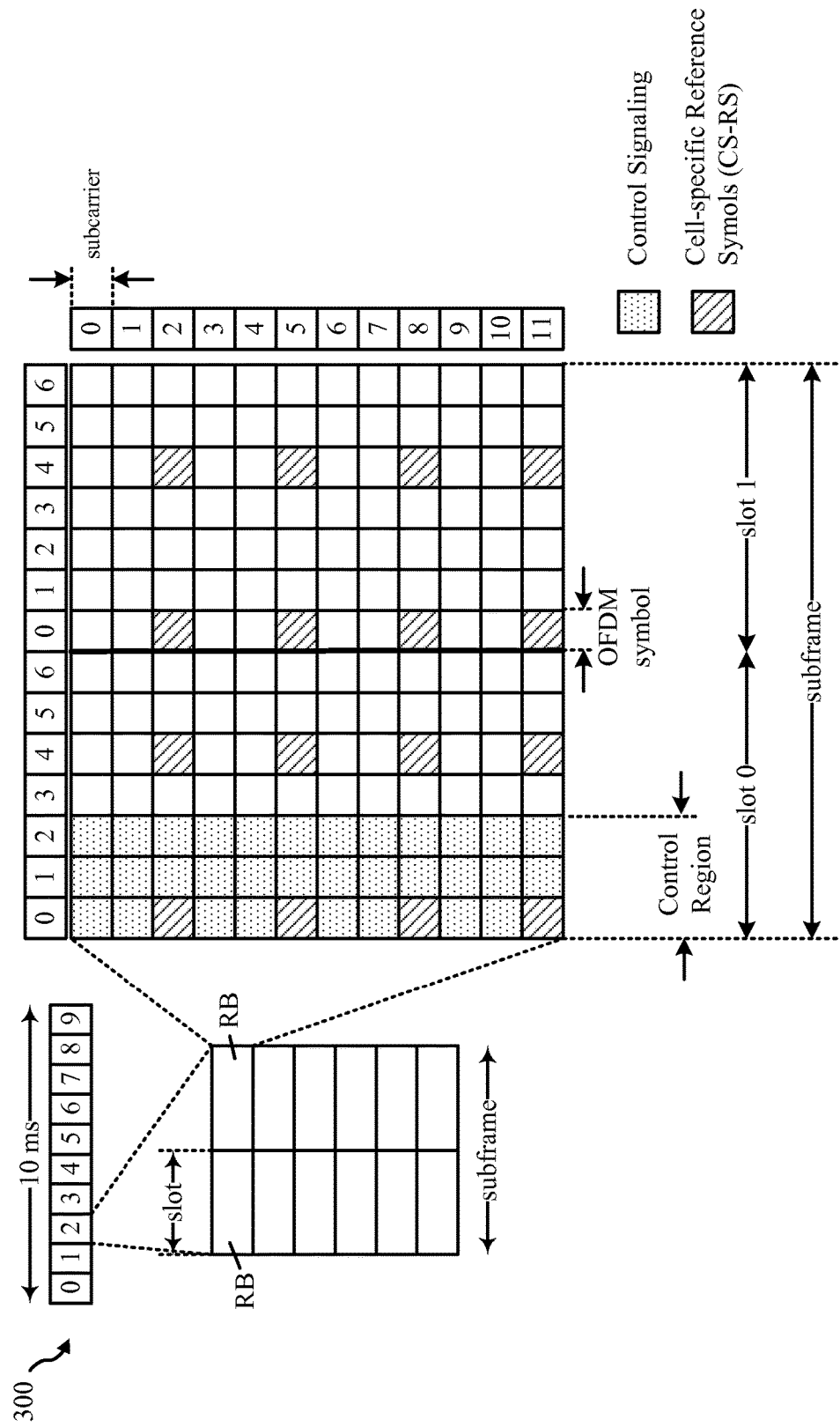
FIG. 3 shows a diagram that illustrates an example of another frame structure.

FIG. 3 shows a diagram that illustrates an example of another frame structure that may be used in a wireless communication system, including the wireless communication system described above with reference to FIG. 1. The frame structure may be used in long term evolution (LTE) or similar systems. A frame (e.g., 10 ms) 300 may be divided into 10 equally sized sub-frames. Each sub-frame may include two consecutive time slots. A resource grid may be used to represent two time slots, each time slot including a resource block (RB). The resource grid may be divided into multiple resource elements.

In LTE, a resource block may contain 12 consecutive subcarriers in the frequency domain and, for a normal cyclic prefix in each orthogonal frequency-division multiplexing (OFDM) symbol, 7 consecutive OFDM symbols are in the time domain, or 84 resource elements. The number of bits carried by each resource element may depend on the modulation scheme. Thus, the more resource blocks that a UE receives and the higher the modulation scheme, the higher the data rate may be for the UE.

In this example, the first 1-3 or 1-4 OFDM symbols in the first slot may be used as a control region that includes control signaling symbols (dotted) and cell-specific reference symbols (CS-RS) (diagonal lines). The CR-RS may also be included in the remaining portion of the first slot and in the second slot. Control information provided in the control signaling symbols may include control information for one or multiple UEs contained in downlink control information (DCI) messages transmitted through physical downlink control channel (PDCCH). After the dedicated control region, data may be included in any of the unused resource elements (in white) via a physical downlink shared channel (PDSCH).

For example, for a downlink (e.g., a unicast reception in the same subframe), the PDCCH may provide a DCI grant that indicates the MCS of the incoming data, the location in the orthogonal frequency-division multiple access (OFDMA) grid and the number of OFDM sub-carriers (e.g., the number of physical resource blocks (PRBs). Thus, the PDCCH or the DCI thereof may include an MCS value as discussed herein. Switching between power modes as described herein may be performed during the receipt of the control information via the PDCCH (after the MCS value is determined), or after receipt of the control information is completed. Initiating the switch earlier may provide more time for the switch to complete before data arrives.

The data (e.g., PDSCH) may be received in the next OFDM symbol following the PDCCH, which provides no safe window of time for the power mode switch to occur. Alternatively, the data may be received one to three OFDM symbols after the PDCCH (e.g., spanning seven OFDM symbols of that slot to maintain a PRB allocation of seven residual OFDM symbols). In such case, 71 to 213 μs (where each OFDM symbol is 71 μs) of "blackout time," during which no receptions are expected, may allow for a more relaxed transition between power modes to be made.

Figure 4:
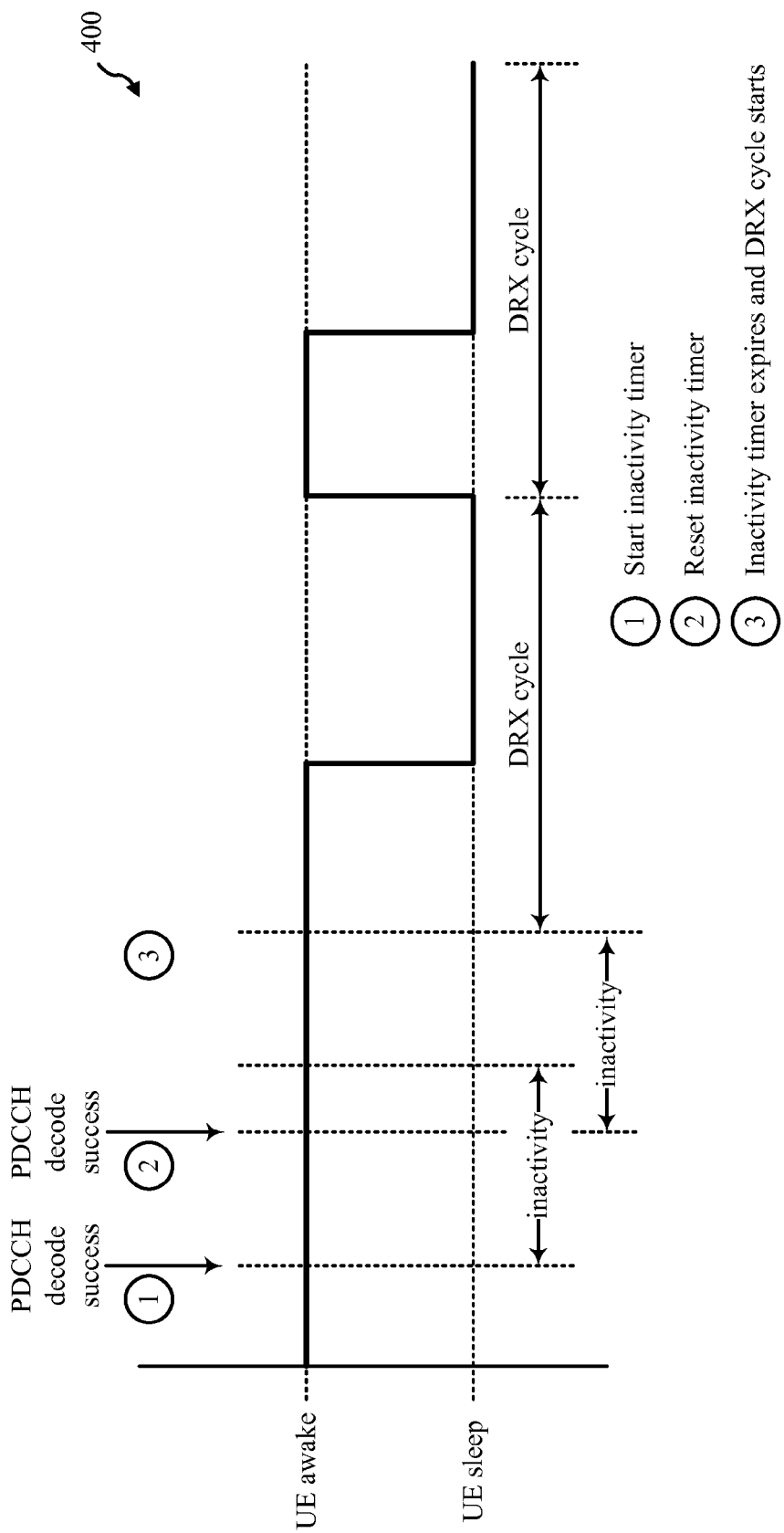
FIG. 4 shows a diagram that illustrates a timing chart of a DRX cycle in connection with PDCCH decoding.

FIG. 4 shows a diagram that illustrates a timing chart 400 of a discontinuous reception (DRX) cycle in connection with PDCCH decoding. In the chart 400, a successful PDCCH decoding starts an inactivity timer (1) when the UE is awake. The inactivity timer may expire after certain duration. However, when another successful PDCCH decoding starts before the inactivity timer expires, the inactivity timer may be reset (2). After the inactivity timer expires (3), the DRX cycle may start and dynamic power mode control as described herein may be applied. While in the DRX mode, the UE may operate in a low power mode (e.g., LPRFA) and may switch to a high power mode (e.g., HPRFA) based on a determined MCS value. Thus, the UE may operate in the low power mode during the inactivity period, during which the UE continues to receive sub-frames and to decode the associated PDCCH.

The following description is provided in terms of a device (e.g., a station 115 described with reference to FIG. 1) being in a reception mode for receiving incoming data. However, it should be understood that the various aspects described may be applied to the device in a transmission mode for transmitting data as well. For example, although not determined from incoming control information, an MCS value for outgoing data (e.g., an outgoing frame) may be determined and used to dynamically adapt power control of the device by adaptively switching between power modes based on the MCS value, either alone or in combination with other factor(s). Thus, the adaptive power control described herein may be based on in-frame information during active transmission and/or active reception modes of the device opportunistically on a per-packet transmit/arrival basis.

The various adaptive power control approaches described herein may take advantage of a significantly higher tolerance for reception for lower values of MCS. For example, up to MCS6 may be safely received in a low or reduced power mode (e.g., a low power radio frequency/analog (LPRFA) mode) when the LPRFA mode involves bypassing a low dropout regulator (LDO) of a synthesizer or a phase locked loop (PLL) and reducing a bias to an external crystal oscillator (XTAL). Even MCS7 in lower bandwidth modes possibly may be received in the LPRFA mode. As noted above with respect to FIG. 2A, a WLAN (e.g., WiFi) preamble may include information (e.g., an MCS value) regarding the MCS with which the data portion of the frame is encoded. Thus, the MCS information may be readily available to use for adaptive power control as described herein.

In one aspect, a device in a reception mode may opportunistically (e.g., adaptively) switch power modes based on in-frame information. In some embodiments, all packets of incoming data may be received with the device in a high or increased power mode (e.g., a high power radio frequency/analog (HPRFA) mode), as may be done conventionally. Upon detecting or otherwise determining an MCS value of the incoming data (e.g., in the L-SIG field 230 for legacy packets, or in the HT-SIG 1/2 field 235 for 11n/11ac packets, in FIG. 2B), a transition from the HPRFA mode into a LPRFA mode may be triggered, based on the MCS value of the incoming data. For example, if the MCS value of the incoming data is less than a threshold MCS value, the device may switch to the LPRFA mode to receive the data. Otherwise, the device may remain in the HPRFA mode to receive the data.

In other embodiments, all packets of incoming data may be received with the device in the LPRFA mode. Upon detecting or otherwise determining an MCS value of the incoming data, a transition from the LPRFA mode into a HPRFA mode may be triggered, based on the MCS value of the incoming data. For example, if the MCS value of the incoming data is greater than a threshold MCS value, the device may switch to the HPRFA mode to receive the data. Otherwise, the device may remain in the LPRFA mode to receive the data. As noted above, such embodiments thus may automatically employ the LPRFA mode during any hiatus (lack of reception of data) that may occur in the connected mode DRX states, such as illustrated by the inactivity periods illustrated in FIG. 4. During the inactivity periods, the device may continue to receive sub-frames and decode the PDCCH. With the device initially in the LPRFA mode for receiving incoming data, such reception and decodes may be performed with the device in the LPRFA mode.

In either case, switching between the LPRFA and the HPRFA modes may be performed in various ways. One approach may be to switch a voltage source for a radio frequency (RF) PLL and an RF synthesizer, for example, from a 1.1 volt (V) LDO to a 1.1 V switched-mode power supply (SMPS), and shutting off the LDOs to transition from the HPRFA mode to the LPRFA mode. Alternatively, either the RF PLL or the RF synthesizer may be switched from the 1.1 V LDO to the 1.1 V SMPS, and the LDOs may be shut off. The opposite may be employed for transitioning from the LPRFA mode to the HPRFA mode. However, an additional time allowance (e.g., budget) for the LDO to be turned on may be provided before the switch from the 1.1 V SMPS to the 1.1 V LDO is made.

Another approach for switching from the HPRFA mode to the LPRFA mode may be to reduce a bias current to the eternal crystal oscillator (XTAL) circuit (or other high performance mode circuits) to minimize current drawn thereby. Conversely, for switching from the LPRFA mode to the HPRFA mode, the bias current to the XTAL circuit or other high performance mode circuits may be increased.

Figure 5:
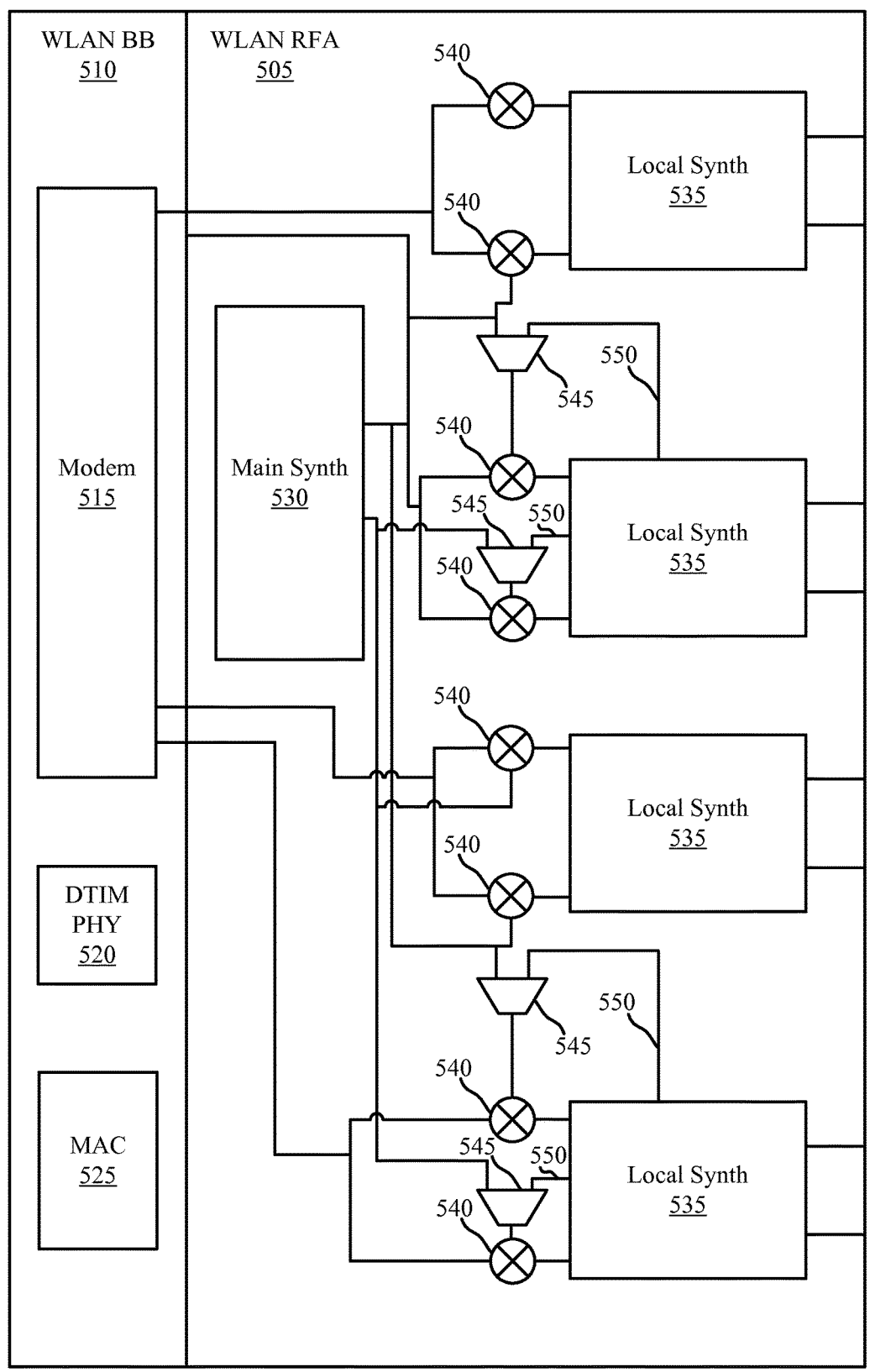
FIG. 5 shows a block diagram of an example of an arrangement of components that may be employed by a wireless communication device to transition between power modes.

Yet another approach may be to switch between the HPRFA and LPRFA modes by switching between a high power (HP) synthesizer and a low power (LP) synthesizer. FIG. 5 shows a block diagram 500 of an example of an arrangement of components that may be employed as such.

The components may be part of a WLAN radio frequency/analog (RFA) circuitry 505. The block diagram 500 also includes a WLAN baseband (BB) circuitry 510 for context. The WLAN BB circuitry 510 shown in FIG. 3 includes a modem 515, a DTIM physical (PHY) layer 520 and a media access control (MAC) layer 525.

The WLAN RFA circuitry 505 shown in FIG. 5 includes a high power (HP) or main synthesizer 530, which may provide excellent phase noise but consumes a lot of power, and a plurality of low power (LP) or local synthesizers 535. As used herein, "high power" or "higher power" and "low power" or "lower power" are relative to each other, with no set values or specific power ratio, and may be determined in accordance with various implementations. Further, high/higher power and low/lower power may involve a respective range of values and/or multiple distinct values rather than a single set value. Local oscillator (LO) routing from the main synthesizer 530 to mixers 540 of each Rx/Tx chain is relatively long, thus consuming a lot of power to drive LO distribution.

The local synthesizers 535 may have lower phase noise (PN) and inter-carrier interference (ICI) requirements than the main synthesizer 530. The lower PN and ICI requirements may be achieved with a ring oscillator or a relatively small LC tank (LC circuit, resonant circuit, tuned circuit, etc.). Such a voltage controlled oscillator (VCO) may run from 2.4 GHz to 6 GHz and may support dual bands (e.g., 11a/b/g/n/ac). Such a relatively small sized VCO allows the VCO to be located near the Rx/Tx mixers 540, thus limiting the LO routing from the local synthesizers 535 to the mixers 540 of each Rx/Tx chain and reducing power consumption for LO distribution.

The LO (e.g., VCO) of the local synthesizers 535 may be multiplexed with the LO of the main synthesizer 530, for example, via multiplexers 545. In-phase and quadrature components 550 from the VCO of the local synthesizers 535 may be provided directly to the multiplexers 545, thus bypassing LO distribution and further reducing power consumption.

The arrangement of components of the WLAN RFA circuitry 505 described above thus may provide a means for adaptively switching or transitioning between high and low power modes of the associated wireless communication device. Switching from the main synthesizer 530 routed to each of a plurality of transmission/reception (Tx/Rx) chains associated with the modem 515 to the local, lower-powered synthesizers 535 routed respectively to one of the plurality of Tx/Rx chains may switch/transition the device from a high power mode to a low power mode. Conversely, switching to the main synthesizer 530 from the local, lower-powered synthesizers 535 may switch/transition the device from the low power mode to the high power mode.

The arrangement of components of the WLAN RFA circuitry 505 described above is only an example of an implementation of a technique that may be employed to transition between power modes of a wireless communication device. Further, it should be understood that the block diagram 300 is only a basic illustration and does not include all circuitry or components that may be employed. Other techniques may be employed as well. For example, adaptively switching/transitioning between power modes of a device may involve changing a voltage source of a phase locked loop (PLL), a synthesizer, or both. Alternatively or additionally, the switching/transitioning may involve turning off (or on) a low dropout regulator (LDO) of a PLL, an LDO of a synthesizer, or both. Alternatively or additionally, the switching/transitioning may involve changing a bias current to a high performance circuit or circuits.

The transitions between power modes described herein may be performed almost seamlessly, but may cause or otherwise result in a slight glitch. The glitch may translate into transient phase errors, which may translate into elevated EVM transients. Therefore various mitigation techniques may be employed to reduce or even eliminate the potential effects of the glitch. For example, the bandwidth of the synthesizer loop may be increased before the power mode switch, which may result in a faster settling of the VCO and sooner stabilization of the phase error. Alternatively or additionally, a lower MCS rate (less than the MCS rate of the HPRFA mode) for the transition point to absorb the glitch within the EVM constraints of the adopted MCS rate. Alternatively or additionally, for a fixed or systematic glitch (or a portion thereof), a pre-determined phase adjustment may be applied to compensate for the glitch. Other mitigation techniques may be suitable as well. Any residual phase error may be corrected by pilot tracking or by a decision-feedback (DF) equalizer. The phase error caused by the glitch may be mitigated, for example, to a point at which the phase error may be imperceptible for lower MCS rates. Thus, transitioning from the HPRFA mode to the LPRFA mode may be preferable in some cases.

In some embodiments, the switch or transition between power modes may be effected immediately after determining the MCS value (e.g., in the L-SIG field 230 or the HT-SIG 1/2 field 235) while still in the preamble (e.g., 205 in FIG. 2A or prior to 250 in FIG. 2B). Alternatively, the switch or transition between power modes may be effected after the preamble (e.g., during the data portion 210 in FIG. 2A or 250 in FIG. 2B) so that the preamble may be received in a stable state of the receiver of the device.

As mentioned above, other factors in addition to the MCS value may be considered for determining whether a power mode switch is to be made. For example, a length of the packet(s) to be received (or transmitted) may be one factor. A switch may be warranted when the length of the packet(s) is sufficient to allow a benefit to be realized from the switch. Another factor to consider may be whether beam-formed and/or single user (SU) packet(s) are to be received (or transmitted). For example, if a first or second AGC shows sufficiently low interference (e.g., blocker interference, adjacent channel interference (ACI), etc.), then a transition from the HPRFA mode to the LPRFA mode may be allowed. Yet another factor that may be considered in conjunction with the MCS value is a received signal strength indicator (RSSI) value, a signal-to-noise ratio (SNR) value and/or a signal-to-interference-plus-noise ratio (SINR) value, as compared with a suitable threshold, which may depend on the MCS value and/or the particular LPRFA mode to be used.

In some embodiments, misdirected packets (e.g., partial association identifier/group identifier (pAID/GID) mismatch, recipient address (RA) mismatch, delimiter error, PHY error, etc.) may trigger a switch to the LPRFA mode (unless the device is already in the LPRFA mode). Such a switch may be made unconditionally for the length of the "NAP" state (during which the PHY layer and/or the MAC layer is/are put in a nap mode until a new frame appears in the medium). If the "NAP" state is revoked, a switch to the HPRFA mode may be made.

As mentioned above, the adaptive power control approaches described herein may be applied for a device in a reception mode, in a transmission mode, or both. However, in some embodiments, it may be desirable to apply the power control approaches only for the reception mode, with the transmission mode always pre-ramping into the HPRFA mode.

Figure 6A:
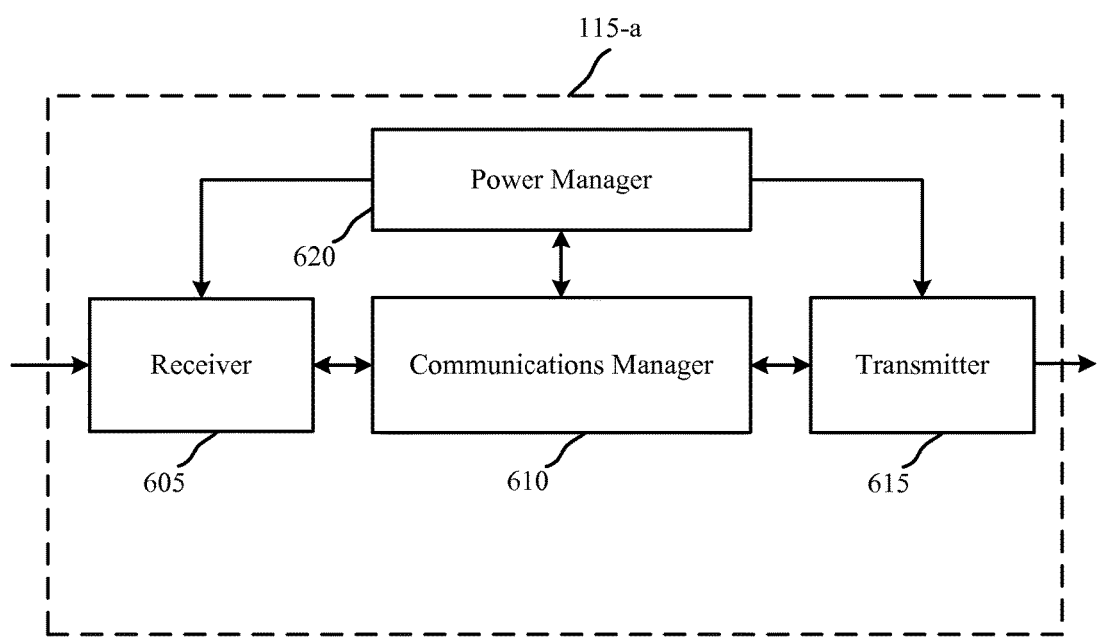
FIG. 6A shows a block diagram of an example of a wireless communication device.

With reference now to FIG. 6A, a block diagram 600-*a* illustrates a wireless communication device 115-*a* (e.g., a WLAN station 115 or UE described with reference to FIG. 1) that may be configured to adaptively switch or transition between power modes in accordance with various embodiments. The device 115-*a* may be an example of various aspects of the stations 115 described with reference to FIG. 1, and may include circuitry such as described with respect to FIG. 5. The device 115-*a*, or portions thereof, may also be a processor. The device 115-*a* may include a receiver 605, a communications manager 610, a transmitter 615 and a power manager 620. Each of these components may be in communication with each other.

The components of the device 115-*a* may, individually or collectively, be implemented with an application-specific integrated circuit(s) (ASIC(s)) adapted to perform some or all of the applicable functions in hardware. Alternatively, the functions may be performed by other processing units (or core), on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 605 may receive communications from other devices, such as other devices 115 and/or the AP 105 described with reference to FIG. 1. The transmitter 615 may send communications from the device 115-*a* to other devices 115 and/or the AP 105. The communications manager 610 may be configured to manage such communications via the receiver 605 and/or the transmitter 615. Further, the communications manager 610 may be configured to determine in-frame information associated with outgoing and/or incoming data, for example, control information associated with the data. Based on the determined in-frame information, the power manager 620 may be configured to determine a desired power mode and implement the desired power mode for the device 115-*a* by switching/transitioning between power modes. For example, the power manager 620 may communicate with the receiver 605, the communications manager 610 and/or the transmitter 615 to turn on/off such components, or components thereof, to change voltages and/or currents supplied thereto, or to otherwise alter the power consumption of the device 115-*a* in operation.

In some embodiments, the receiver 605 may be means for receiving an incoming frame including control information and data. In some embodiments, the power manager 620, either alone or in combination with the communications manager 610, may be means for transitioning from one power mode to another power mode. Further, the receiver 605, the communications manager 610, the transmitter 615 and/or the power manager 620, either alone or in various combinations, may be means for performing any of the functions or operations described above, or described further below with respect to FIGS. 9 and/or 10, for example.

Figure 6B:
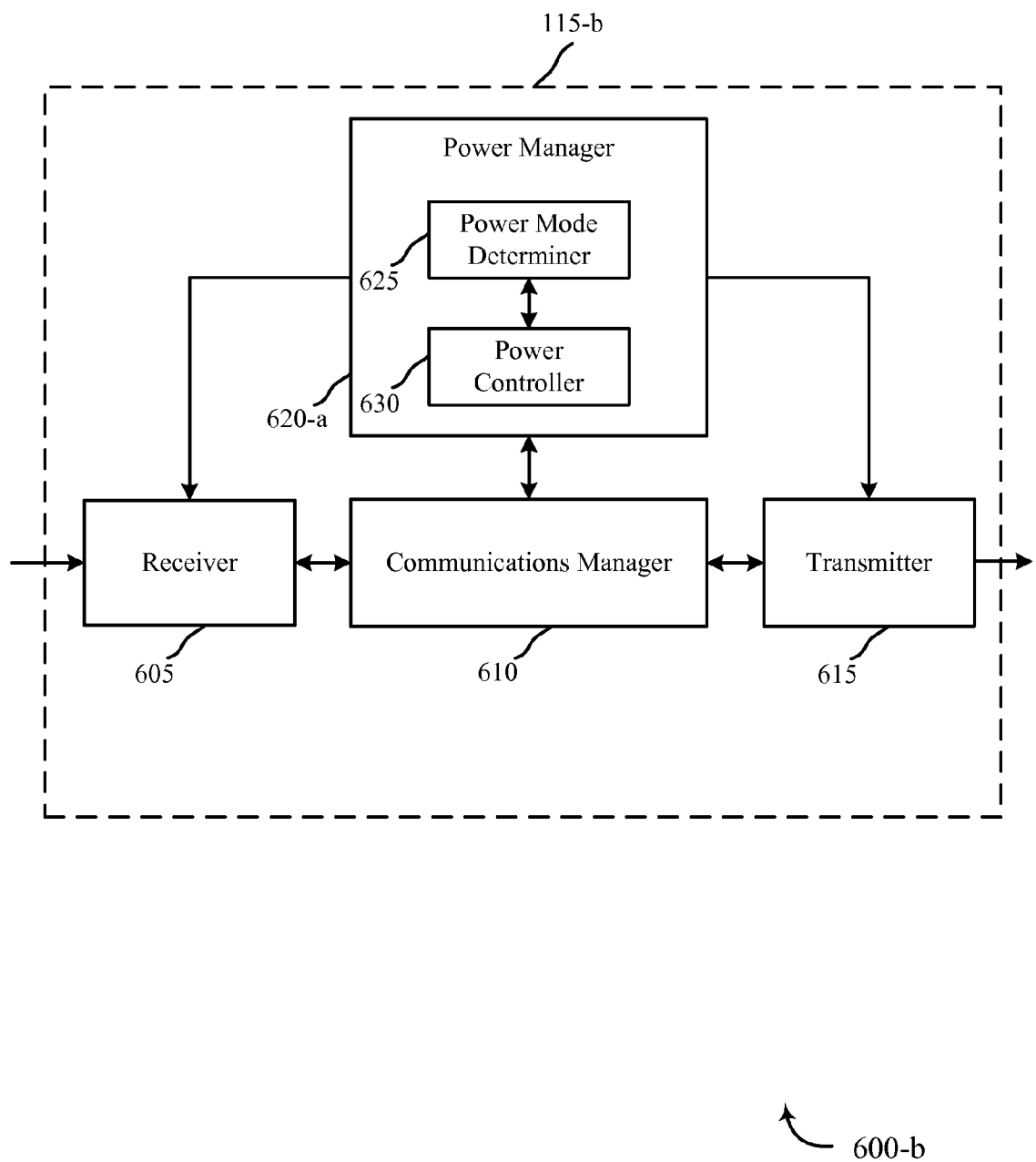
FIG. 6B shows a block diagram of another example of a wireless communication device.

FIG. 6B shows a block diagram 600-*b* that illustrates another wireless communication device 115-*b* (e.g., a WLAN station 115 or LTE UE described with reference to FIG. 1) may be configured to adaptively switch or transition between power modes in accordance with various embodiments. The device 115-*b* may be an example of various aspects of the stations 115 described with reference to FIGS.

1 and/or 6A, and may include circuitry such as described with respect to FIG. 5. The device 115-*b*, or portions thereof, may also be a processor. The device 115-*b* may include a receiver 605, a communications manager 610, a transmitter 615 and a power manager 620-*a*. Each of these components may be in communication with each other.

The components of the device 115-*b* may, individually or collectively, be implemented with an application-specific integrated circuit (ASIC) adapted to perform some or all of the applicable functions in hardware. Alternatively, the functions may be performed by a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 605, the communications manager 610 and the transmitter 615 may be configured as previously described with respect to FIG. 6A. The power manager 620-*a* may include a power mode determiner 625 and a power controller 630.

The power manager 620-*a* may be configured to perform the various functions to manage power modes of the device 115-*b* as described above with respect to FIG. 6A. In this example, the power manager 620-*a* may receive in-frame information from the communications manager 610 related to an incoming or outgoing frame (e.g., preamble, control information, MCS, etc.). The power manger 620-*a* may provide such information to the power mode determiner 625 to determine the desired power mode for transmitting or receiving the frame. The power mode determiner 625 may determine the desired power mode using the in-frame information, and possibly other factors, as described herein. The power mode determiner 625 may indicate the desired power mode either to the power controller 630 or to the power manager 620-*a*, which may control or otherwise instruct the operations of the power controller 630. The power controller 630 may be configured to implement the desired power mode using various techniques, such as the techniques described above and/or techniques described below. In some embodiments, the power controller 630 may be configured to determine a power scheme in accordance with the desired power mode, and may cause the power manager 620-*a* to communicate with various components, such as the receiver 605, the communications manager 610 and the transmitter 615, to implement the determined power scheme.

Figure 7A:
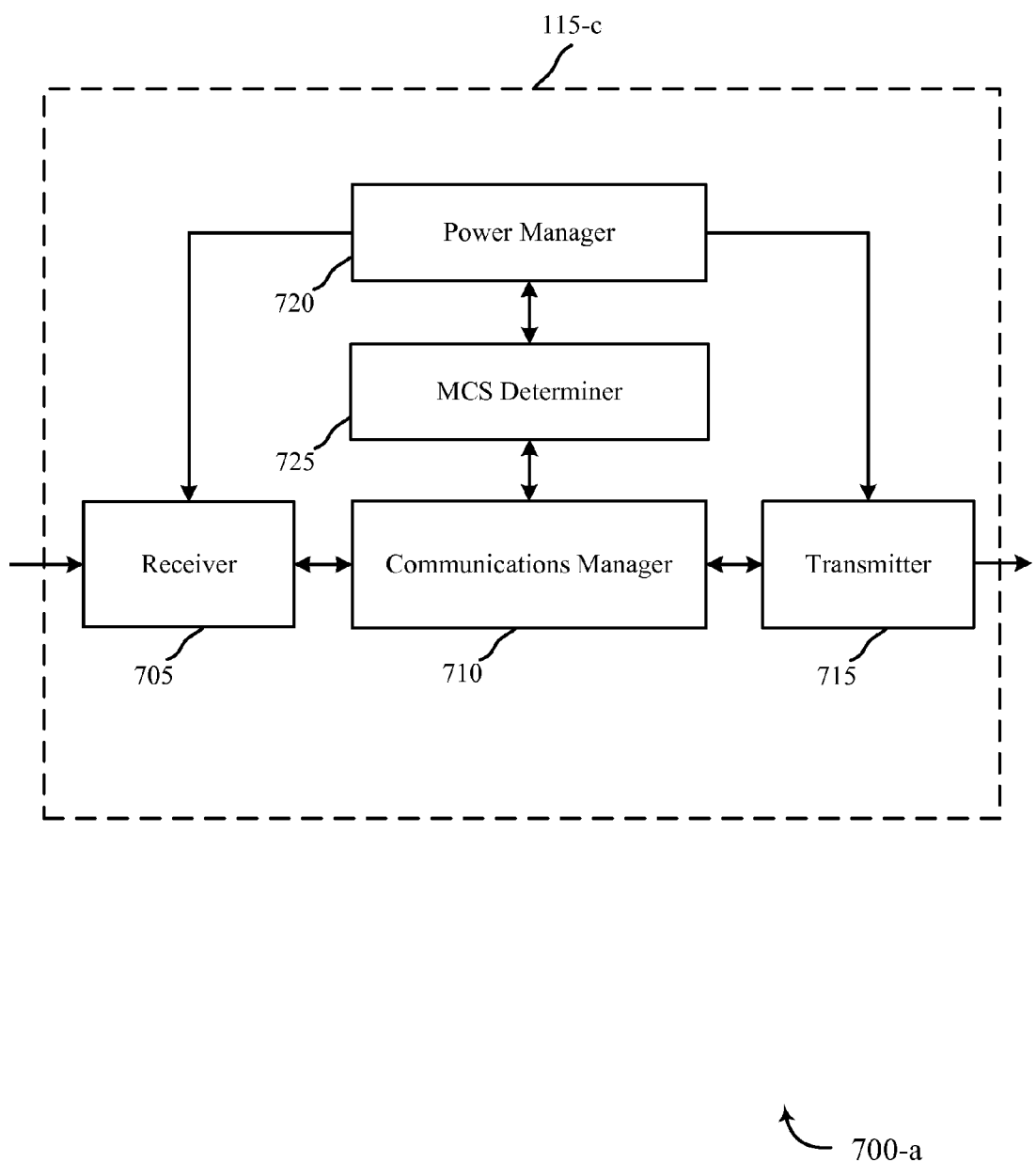
FIG. 7A shows a block diagram of another example of a wireless communication device.

FIG. 7A shows a block diagram 700-*a* that illustrates a wireless communication device or UE 115-*c* (e.g., a WLAN station 115 or LTE UE described with reference to FIG. 1) that may implement adaptive control of power modes. The device 115-*c* may be an example of various aspects of the stations 115 described with reference to FIGS. 1, 6A and/or 6B, and may include circuitry such as described with respect to FIG. 5. The device 115-*c*, or portions thereof, may also be a processor. The device 115-*c* may include a receiver 705, a communications manager 710, a transmitter 715, a power manager 720 and an MCS determiner 725. Each of these components may be in communication with each other.

The components of the device 115-*c* may, individually or collectively, be implemented with an application-specific integrated circuit (ASIC) adapted to perform some or all of the applicable functions in hardware. Alternatively, the functions may be performed by a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 705, the communications manager 710 and the transmitter 715 may be configured as previously described with respect to FIGS. 6A and/or 6B. In this example, the power manager 720 may be configured to receive an MCS value from the MCS determiner 725, as well as other information from the communications manager 610 related to an incoming or outgoing frame. The MCS determiner 725 also may receive information related to an incoming or outgoing frame from which the MCS determiner 725 may determine the MCS value associated with the frame (e.g., from the communications manager 710). Based on the MCS value determined and provided by the MCS determiner 725, the power manager 720 determine a desired power mode. The power manager 720 may consider other factors, as described herein, in addition to the MCS value to determine the desired power mode. The power manager 720 may be configured to implement the desired power mode using various techniques, such as the techniques described above and/or techniques described below. In some embodiments, the power manager 720 may be configured to determine a power scheme in accordance with the identified MCS (and other factors, as appropriate or desired), and may cause various components, such as the receiver 605, the communications manager 610 and the transmitter 615, to implement the determined power scheme.

Figure 7B:
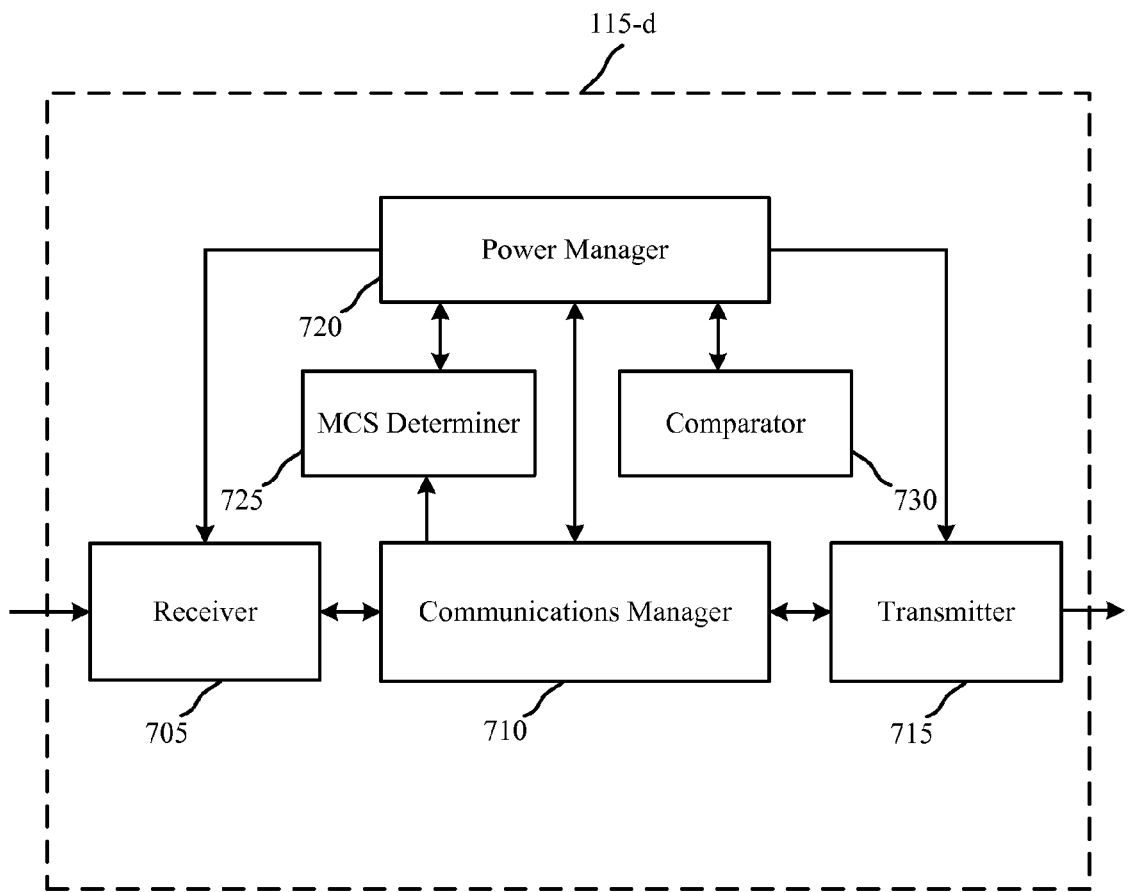
FIG. 7B shows a block diagram of another example of a wireless communication device.

FIG. 7B shows a block diagram 700-*b* that illustrates another wireless communication device or UE 115-*d* (e.g., a WLAN station 115 or UE described with reference to FIG. 1) that may implement adaptive control of power modes. The device 115-*d* may be an example of various aspects of the stations 115 described with reference to FIGS. 1, 6A, 6B and/or 6A, and may include circuitry such as described with respect to FIG. 5. The device 115-*d*, or portions thereof, may also be a processor. The device 115-*d* may include a receiver 705, a communications manager 710, a transmitter 715, a power manager 720, an MCS determiner 725 and a comparator 730. Each of these components may be in communication with each other.

The components of the device 115-*d* may, individually or collectively, be implemented with an application-specific integrated circuit (ASIC) adapted to perform some or all of the applicable functions in hardware. Alternatively, the functions may be performed by a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 705, the communications manager 710 and the transmitter 715 may be configured as previously described with respect to FIGS. 6A, 6B and/or 7A. In this example, the power manager 720 may be configured to receive an MCS value from the MCS determiner 725, as well as other information from the communications manager 610 related to an incoming or outgoing frame, as described above. The MCS determiner 725 also may receive information related to an incoming or outgoing frame from which the MCS determiner 725 may determine the MCS value associated with the frame. The power manager 720 may provide the MCS value determined by the MCS determiner 725 to the comparator 730, which may be configured to compare the MCS value to a threshold MCS value. For example, the comparator 730 may include two threshold MCS values for comparison, such as a first threshold MCS value for switching to the HPRFA and a second MCS value for switching to the LPRFA. In some embodiments, the threshold MCS values may be MCS values associated with the respective power modes (e.g., the HPRFA and the LPRFA). Based on a result of the comparison(s), the power manager 720 may determine a desired power mode. The power manager 720 may consider other factors, as described herein, in addition to the result of the MCS value comparison(s) to determine the desired power mode. The power manager 720 may be configured to implement the desired power mode using various techniques, such as the techniques described above and/or techniques described below.

Figure 8:
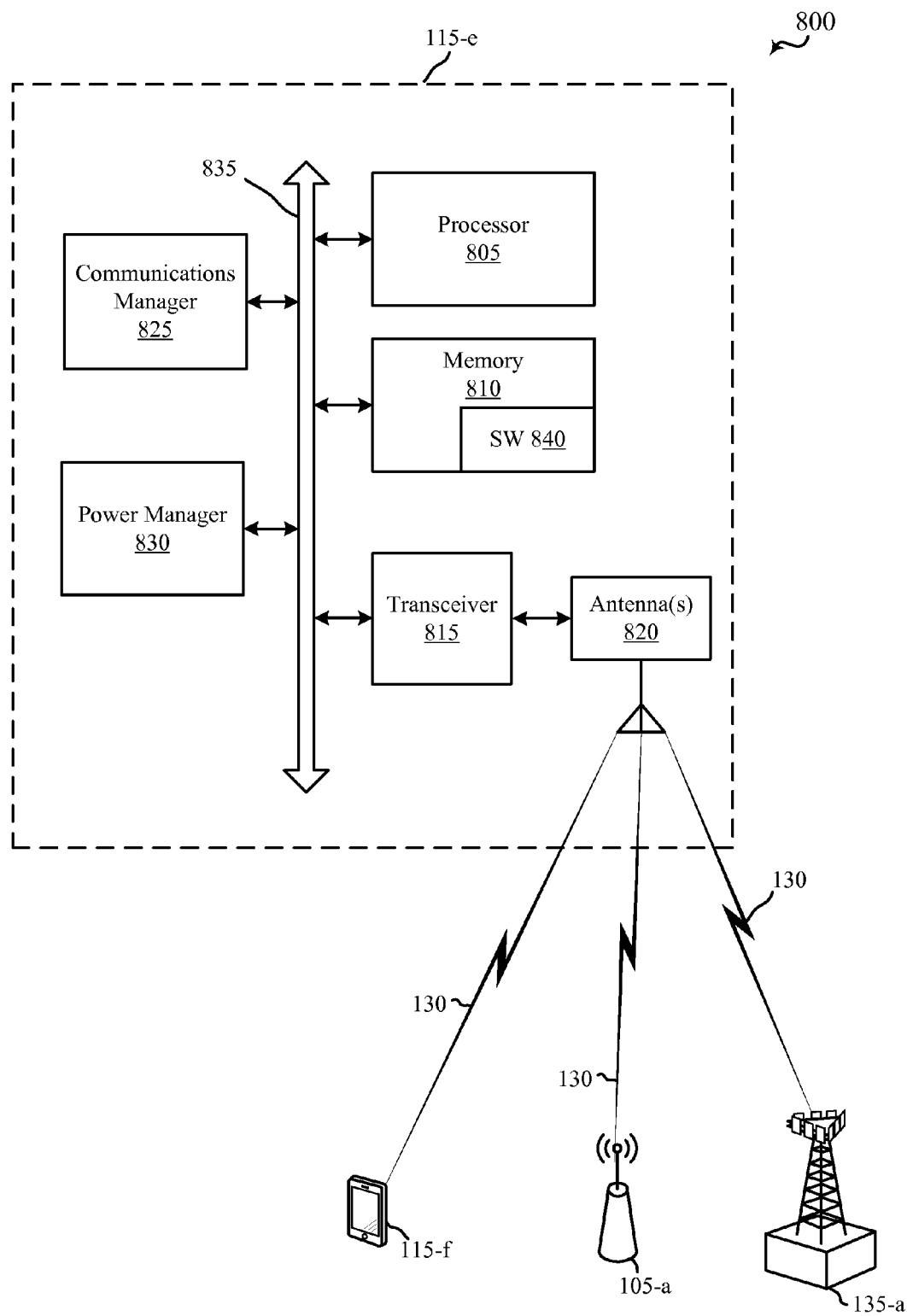
FIG. 8 shows a block diagram of an example of a wireless communication device architecture according to various embodiments.

Turning to FIG. 8, a block diagram 800 illustrates an architecture of a wireless communication device 115-e (e.g., a WLAN station or LTE UE) according to various embodiments. The device (e.g., station) 115-e may have various other configurations and may be included in or be part of a personal computer (e.g., laptop computer, netbook computer, tablet computer, etc.), a cellular telephone, a PDA, a digital video recorder (DVR), an internet appliance, a gaming console, an e-reader, etc. The device 115-e may have an internal power supply (not shown), such as a small battery, to facilitate mobile operation. The device 115-e may be an example of the devices/stations 115 of FIGS. 1, 6A, 6B, 7A and/or 7B.

The device 115-e may include a processor 805, a memory 810, a transceiver module 815, antenna(s) 820, a communications manager 825 and a power manager 830. The power manager 830 may be an example of the power manager 620, 620-a and/or 720 of FIGS. 6A, 6B, 7A and/or 7B, respectively. Each of these components may be in communication with each other, directly or indirectly, over a bus 835 for example.

The memory 810 may include RAM and/or ROM. The memory 810 may store computer-readable, computer-executable software (SW) code 840 containing instructions that are configured to, when executed, cause the processor 805 to perform various functions described herein for power mode control. Alternatively, the software code 840 may not be directly executable by the processor 805 but be configured to cause a computer (e.g., when compiled and executed) to perform functions described herein.

The processor 805 may include an intelligent hardware device, e.g., a CPU, a microcontroller, an ASIC, etc. The processor 805 may process information received through the transceiver module 815 and/or to be sent to the transceiver module 815 for transmission through the antenna(s) 820. The processor 805 may handle, alone or in connection with the communications manager 825 and or the power manager 830, various aspects for adaptively controlling (switching, transitioning, etc.) power modes of the device 115-e as described herein.

The transceiver module 815 may be configured to communicate bi-directionally with an AP 105-a, a base station 135-a and/or another device (e.g., station) 115-f, each of which may be an example of the corresponding devices 105, 135 and 115 in FIG. 1. The transceiver module 815 may be implemented by a transmitter and a receiver. The transceiver module 815 may include a modem configured to modulate packets and provide the modulated packets to the antenna(s) 820 for transmission, and to demodulate packets received from the antenna(s) 820. While the device 115-e may include a single antenna 820, there may be embodiments in which the device 115-e may include multiple antennas 820.

The components of the device 115-e may be configured to implement aspects discussed above with respect to FIGS. 1-7B, and those aspects may not be repeated here for the sake of brevity. Moreover, the components of the device 115-e may be configured to implement aspects discussed below with respect to FIGS. 9-10, and those aspects may not be repeated here also for the sake of brevity.

Figure 9:
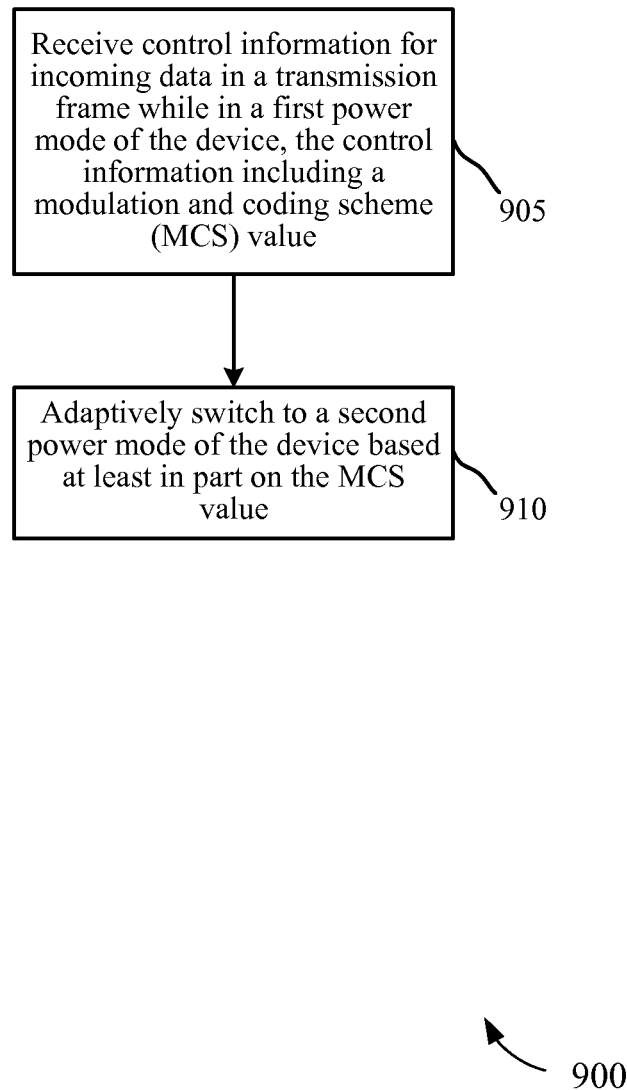
FIG. 9 is a flowchart of a method for implementing adaptive power control of a wireless communication device.

Turning next to FIG. 9, a flowchart is illustrated of a method 900 for implementing adaptive power control in accordance with various embodiments. The method 900 may be implemented using, for example, the devices 115 of FIGS. 1, 6A, 6B, 7A, 7B and/or 8, for example. According to the method 900, the device 115 may be in a reception mode for receiving an incoming transmission frame. In one implementation, the communications manager 610, 710 and/or 825 described with reference to FIGS. 6A, 6B, 7A, 7B and/or 8, respectively, may be configured to execute a set of codes to control the functional elements of a device 115 to perform the functions described below.

At block 905, the device 115 may receive control information for incoming data in a transmission frame while in a first power mode of the device. The control information may include a modulation and coding scheme (MCS) value. At block 910, the device 115 may adaptively switch to a second power mode of the device based on the MCS value. According to the method 900, the second power mode may be a lower power mode than the first power mode. As such, as described above, the device 115 may implement a lower power mode for receiving the data in the transmission frame when the MCS value associated with the incoming frame indicates that the lower power mode is appropriate or desired to conserve power.

Therefore, the method 900 may be used to adaptively control power modes of the device so that a low power mode may be implemented for receiving incoming data when appropriate or possible, and a high power mode may be used for receiving incoming data when the low power mode is inappropriate or unsuitable. Thus, the device 115 may implement various different power modes for a reception of data, using in-frame information that includes an MCS value. It should be noted that the method 900 is just one implementation and that other implementations are possible.

Figure 10:
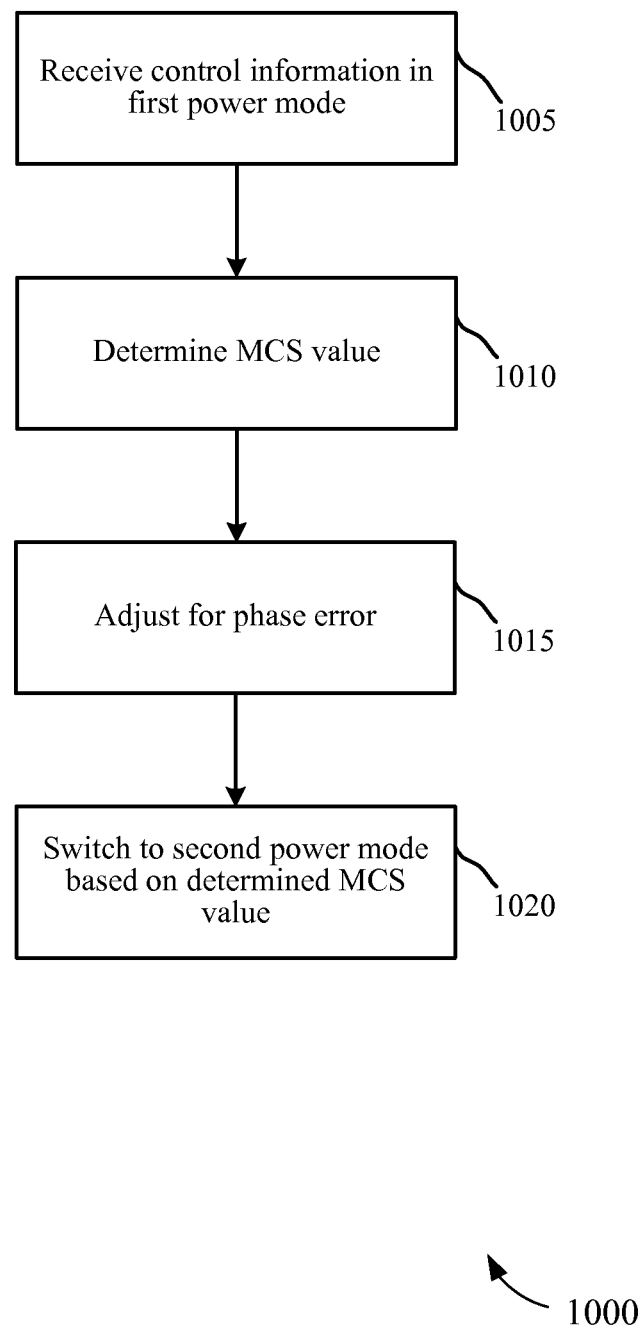
FIG. 10 is a flowchart of another method for implementing adaptive power control of a wireless communication device.

FIG. 10 is a flowchart of another method 1000 for implementing adaptive power control in accordance with various embodiments. The method 1000 may be implemented using, for example, the devices 115 of FIGS. 1, 6A, 6B, 7A, 7B and/or 8, for example. According to the method 1000, the device 115 may be in a reception mode for receiving an incoming transmission frame. In one implementation, the communications manager 610, 710 and/or 825 described with reference to FIGS. 6A, 6B, 7A, 7B and/or 8, respectively, may be configured to execute a set of codes to control the functional elements of a device 115 to perform the functions described below.

At block 1005, the device 115 may receive control information of a transmission frame in first power mode. The control information may be in a WLAN preamble, a control region (e.g., a DCI of a PDCCH), etc., according to the structure of the frame. The control information may include an MCS value corresponding to the MCS with which the data is coded. At block 1010, the device 115 may determine the MCS value of the frame. The MCS value may be determined, for example, by identifying the MCS value in the control information. Next, at block 1015, the device 115 may adjust for phase error that is expected to be introduced by switching to a second power mode. Any of the various approaches for mitigating phase error described herein may be employed. Then, at block 1020, the device 115 may switch to a second power mode based on the MCS value. As described herein, the MCS value may indicate that a power mode other than the first power mode is appropriate of desirable for receiving the data of the frame. The MCS value of the frame may be compared to a threshold value or values to determine the appropriate/desired power mode for receiving the data of the frame. Additionally, other factors may be used with the MCS value to determine the appropriate/desired power mode, and when to make a corresponding switch.

According to the method 1000, the second power mode may be a lower power mode than the first power mode. As such, as described above, the device 115 may implement a higher power mode for receiving control information of a frame, and may switch or transition from the higher power mode to a lower power mode when indicated by the MCS value associated with the frame.

Therefore, the method 1000 also may be used to adaptively control power modes of the device so that an appropriate power mode may be implemented for receiving data of a frame, for example, to conserve power and/or to ensure performance. It should be noted that the method 1000 is just one implementation and that other implementations are possible. For example, various implementations may be obtained by combining features from a combination of methods 900 and/or 1000 with various additional features described herein.

The techniques described herein may be used for the systems and radio technologies mentioned above as well as other systems and radio technologies. The description above, however, describes a WLAN system for purposes of example, and WLAN terminology is used in much of the description above, although the techniques are applicable beyond WLAN applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, a microprocessor in conjunction with a DSP core, or any other such configuration.

The functions described herein may be implemented in hardware, software executed by a processor, firmware, or any combination thereof. If implemented in software executed by a processor, the functions may be stored on or transmitted over an instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items indicates a disjunctive list such that, for example, a list of "A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of adaptive power control for a wireless communication device, comprising:
receiving control information for incoming data in a transmission frame while in a first power mode of the device, the control information including a modulation and coding scheme (MCS) value;
adjusting for phase error before switching to a second power mode to mitigate phase error caused by switching, wherein the adjusting comprises implementing an MCS rate for a transition point between the first power mode and the second power mode, the implemented MCS rate being lower than an MCS rate associated with the second power mode and having error vector magnitude (EVM) constraints that mitigate phase error caused by switching; and
adaptively switching to the second power mode of the device during the transmission frame, wherein the switching is based at least in part on the received MCS value and a bandwidth mode for reception.

2. The method of claim 1, further comprising:
receiving incoming data of the transmission frame while in the second power mode.

3. The method of claim 1, wherein the second power mode is a lower power mode than the first power mode.

4. The method of claim 3, wherein adaptively switching to the second power mode comprises:
switching from a main synthesizer routed to each of a plurality of transmission/reception (Tx/Rx) chains associated with a modem for the first power mode to a plurality of local synthesizers routed respectively to one of the plurality of Tx/Rx chains for the second power mode.

5. The method of claim 3, wherein adaptively switching to the second power mode comprises:
changing a voltage source of a phase locked loop (PLL), a synthesizer, or both;
turning off a low dropout regulator (LDO) of a PLL, an LDO of a synthesizer, or both;
changing a bias current to a circuit;
or a combination thereof.

6. The method of claim 1, wherein adjusting for phase error comprises:
increasing a bandwidth of a synthesizer loop to increase a settling rate of an associated voltage-controlled oscillator (VCO).

7. The method of claim 1, wherein adjusting for phase error comprises:
applying a phase adjustment.

8. The method of claim 1, wherein the second power mode is a higher power mode than the first power mode.

9. The method of claim 8, wherein adaptively switching to the second power mode comprises:
switching to a main synthesizer routed to each of a plurality of transmission/reception (Tx/Rx) chains associated with a modem for the second power mode from a plurality of local synthesizers routed respectively to one of the plurality of Tx/Rx chains for the first power mode.

10. The method of claim 1, wherein adaptively switching to the second power mode also is based on a beam-formed or single user packet that is to be received by the device.

11. The method of claim 1, wherein adaptively switching to the second power mode also is based on a received signal strength indicator (RSSI), a signal-to-noise ratio (SNR) or a signal-to-interference-plus-noise ratio (SINR) of a packet that is to be received by the device.

12. The method of claim 1, wherein switching to the second power mode comprises:
switching to the second power mode during receipt of the control information.

13. The method of claim 1, wherein switching to the second power mode comprises:
switching to the second power mode after receipt of the control information is completed.

14. The method of claim 1, wherein switching to the second power mode comprises:
switching to the second power mode during receipt of the control information via a physical downlink control channel (PDCCH).

15. The method of claim 1, wherein switching to the second power mode comprises:
switching to the second power mode after receipt the control information via a PDCCH is completed.

16. The method of claim 1, wherein the MCS value is an MCS index value.

17. A wireless communication device, comprising:
a receiver configured to receive control information for incoming data in a transmission frame while in a first power mode of the device, the control information including a modulation and coding scheme (MCS) value; and
a power controller configured to:
adjust for phase error before switching to a second power mode to mitigate phase error caused by switching, wherein the adjusting comprises implementing an MCS rate for a transition point between the first power mode and the second power mode, the implemented MCS rate being lower than an MCS rate associated with the second power mode and having error vector magnitude (EVM) constraints that mitigate phase error caused by switching; and
adaptively switch to the second power mode of the device during the transmission frame, wherein the switching is based at least in part on the received MCS value and a bandwidth mode for reception.

18. The device of claim 17, wherein the receiver is further configured to:
receive incoming data of the transmission frame while in the second power mode.

19. The device of claim 7, wherein the second power mode is a lower power mode than the first power mode.

20. The device of claim 19, further comprising:
a main synthesizer routed to each of a plurality of transmission/reception (Tx/Rx) chains associated with a modem for the first power mode; and
a plurality of local synthesizers routed respectively to one of the plurality of Tx/Rx chains for the second power mode, wherein the power controller is configured to adaptively switch to the second power mode by switching from the main synthesizer to the plurality of local synthesizers.

21. The device of claim 17, wherein the MCS value is an MCS index value.

22. An apparatus for adaptive power control for a wireless communication device, comprising:
means for receiving control information for incoming data in a transmission frame while in a first power mode of the device, the control information including a modulation and coding scheme (MCS) value;
means for adjusting for phase error before switching to a second power mode to mitigate phase error caused by switching, wherein the adjusting comprises implementing an MCS rate for a transition point between the first power mode and the second power mode, the implemented MCS rate being lower than an MCS rate associated with the second power mode and having error vector magnitude (EVM) constraints that mitigate phase error caused by switching; and means for adaptively switching to the second power mode of the device during the transmission frame, wherein the switching is based at least in part on the received MCS value and a bandwidth mode for reception.

23. The apparatus of claim 22, wherein the means for receiving is further configured to:

receive incoming data of the transmission frame while in the second power mode.

24. The apparatus of claim 22, wherein the second power mode is a lower power mode than the first power mode.

25. The apparatus of claim 24, further comprising:

a main synthesizer routed to each of a plurality of transmission/reception (Tx/Rx) chains associated with a modem for the first power mode; and a plurality of local synthesizers routed respectively to one of the plurality of Tx/Rx chains for the second power mode, wherein the means for adaptively switching to the second power mode is configured to switch from the main synthesizer to the plurality of local synthesizers to transition the device from the first power mode to the second power mode.

26. The apparatus of claim 22, wherein the MCS value is an MCS index value.

27. A computer program product, comprising:

a non-transitory computer-readable medium including instructions stored thereon, the instructions being executable by a computer to:

receive control information for incoming data in a transmission frame while in a first power mode of the device, the control information including a modulation and coding scheme (MCS) value;

adjust for phase error before switching to a second power mode to mitigate phase error caused by switching, wherein the adjusting comprises implementing an MCS rate for a transition point between the first power mode and the second power mode, the implemented MCS rate being lower than an MCS rate associated with the second power mode and having error vector magnitude (EVM) constraints that mitigate phase error caused by switching; and adaptively switch to the second power mode of the device during the transmission frame, wherein the switching is based at least in part on the received MCS value and a bandwidth mode for reception.

* * * * *